United States Patent [19]

Hainsworth

[11] Patent Number: 4,492,504
[45] Date of Patent: Jan. 8, 1985

[54] MATERIALS HANDLING SYSTEM

[75] Inventor: Thomas E. Hainsworth, Holland, Mich.

[73] Assignee: Bell & Howell Company

[21] Appl. No.: 327,789

[22] Filed: Dec. 7, 1981

[51] Int. Cl.³ .............................................. B60P 1/46
[52] U.S. Cl. .................................. 414/273; 414/278; 414/280
[58] Field of Search ............... 414/273, 274, 275, 277, 414/278, 280, 495, 659, 661, 501, 503, 529, 752, 134

[56] References Cited

U.S. PATENT DOCUMENTS

| | | | |
|---|---|---|---|
| 2,708,046 | 5/1955 | Cushman | 414/661 |
| 2,709,532 | 5/1955 | Marietta | 414/661 |
| 3,357,569 | 12/1967 | Goodman et al. | 414/277 X |
| 3,587,894 | 6/1971 | Parker et al. | 414/280 X |
| 3,727,778 | 4/1973 | Hollenbach | 414/277 X |
| 3,761,040 | 9/1973 | Cummins | 414/495 X |
| 3,820,667 | 6/1974 | Critchlow et al. | 414/752 X |
| 3,854,610 | 12/1974 | Carder | 414/503 |
| 4,010,826 | 3/1977 | Jones | 414/495 |
| 4,162,869 | 7/1979 | Hitomi et al. | 414/134 X |
| 4,252,497 | 2/1981 | Burt | 414/752 X |

OTHER PUBLICATIONS

Ralston, "15 Ways to Control Moving Materials", Control Engineer, Sep. 1968, pp. 90–95.

Primary Examiner—Robert J. Spar
Assistant Examiner—Ken Muncy
Attorney, Agent, or Firm—Varnum, Riddering, Schmidt & Howlett

[57] ABSTRACT

An unmanned guided vehicle (10) is propelled along a path (P) by a traction mechanism. Movement of the vehicle (10) on the path is controlled by a first control. The vehicle (10) includes storage (40) for storing at least one container (30) and transfer mechanism (44) mounted for vertical movement on the vehicle (10) for moving the at least one container (30) between at least one stationary location and the storage (40). The vehicle (10) also includes second control (16) which selectively controls the transfer of the at least one container (30) between the at least one stationary location and the storage (40). The vehicle (10) is moved to the stationary location whereupon the container (30) is moved from the storage (40) to the transfer mechanism (44) and then to the stationary location or vice versa. The invention also encompasses a materials handling system including a self-propelled, automatically controlled vehicle (10) which follows a path (P) so as to transport a plurality of containers (30) between the three spaced areas in a building. The vehicle (10) includes mechanism for automatically and selectively unloading from the vehicle any one of a plurality of containers at any one of the three spaced areas.

19 Claims, 16 Drawing Figures

MATERIALS HANDLING SYSTEM

DESCRIPTION

TECHNICAL FIELD

The invention relates to a materials handling system including an unmanned guided vehicle for use in a warehouse or a factory.

BACKGROUND ART

In many manufacturing and warehouse operations, it is conventional to move inventory and work in progress through the warehouse or factory on long conveyors. In such warehouses and factories, the conveyors are arranged to move parts down an assembly line so that the conveyor is adjacent a work table. Parts used to manufacture a particular object or completed objects can also be transported throughout a factory or warehouse by means of the conveyor system. Such conveyors are long and are typically fixed to the building floor or the like. The conveyors tend to divide a warehouse or factory into discrete areas so that traffic flow is somewhat inhibited. It is apparent that changes in the layout of a factory or warehouse cannot be readily accomplished since the conveyors are fixed to the building structure. Also, the conveyors take up space which could be used for the storage of goods or for additional work areas.

One desired feature in an assembly operation is to keep track of all of the parts in the system at one time. In some systems, a card reader and computer can be used to keep track of raw parts inventory, work in progress and finished goods. Accounting for the inventory depends upon human factors, that is, the assembler must keep all inventory control cards updated as he removes containers or objects from the conveyor line and replaces them with finished goods. Thus, there is a potential that the desired accuracy of such an inventory control system will not be achieved if the assembler fails to keep the cards updated.

It has been known to use an automatic conveying system for moving parts within a warehouse or factory. In such systems, a vehicle is moved about the work space either on a fixed rail or along some guide mechanism so as to transport containers and the like to desired locations in the factory or warehouse. One such example of an automated conveyor system is shown in the Hitomi et al U.S. Pat. No. 4,162,869 patent, issued July 31, 1979. The Hitomi et al patent discloses a conveying control system wherein an unmanned forklift vehicle is guided along leader cables. The vehicle mounts loading and unloading control means for detecting the presence or absence of a load at the vehicle, the number of layers in the load and instructions for conveying the load. The guidance system for the vehicle shown in the Hitomi et al patent requires that cables be buried in the floor of the building or the like which would made rearrangement of the factory layout difficult. Further, the vehicle used in the Hitomi et al system does not have any storage capacity so that only one container or pallet can be transported at a time.

Another type of a load transportation device is shown in the Anderson U.S. Pat. No. 4,010,856 patent, issued Mar. 8, 1977. The device shown in the Anderson patent includes a vertically moveable elevator having pivotally mounted conveyors which transfer a load to storage compartments. The elevator comprises a lifting means and a tilting mechanism which tilts the frame of the elevator so as to unload a unit onto the storage compartment. The vehicle which is used to transport parts is mounted on a track.

Still another warehouse system is shown in the Smith U.S. Pat. No. 4,010,855 patent, issued Mar. 8, 1977. The Smith warehouse system includes a plurality of stored pans and elevator platforms which engage a lip on each pan to pull a pan from a shelf. The platform includes a pair of chains which transfer a pan to and from the platform. This system would be useful in an automated warehousing operation.

The Oku U.S. Pat. No. 4,176,996 patent, issued Dec. 4, 1979, discloses another form of a storage system including a carriage moveable on guide rails positioned adjacent storage shelving. The carriage includes a scanning device which stops the carriage at a designated location in order to facilitate loading and unloading of the carriage.

While various systems have been proposed to move containers and the like through a warehouse or factory, the prior known systems have certain drawbacks. In this regard, some of the systems either require the use of a fixed rail or the like on which an unmanned vehicle is mounted. Such rails or buried cables would not allow for easy redesign of the factory or warehouse. Further, the vehicles used in these prior systems do not have the ability to pick up multiple containers from different locations and deliver them to several locations. Instead, the systems provide for the movement of a single container or package of containers from one point to a second location and do not contemplate the continuous loading and unloading of containers throughout a factory or warehouse such as occurs on an assembly line. It is desirable to provide such a system which allows for flexibility in a manufacturing operation wherein a vehicle can move parts, work in progress and finished goods from a storage area, through an assembly area and finally to a shipping area. It is further desirable to control such a system from a central location which could keep track of all of the parts in the system at any time. Finally, a system wherein a number of vehicles can be dispatched along a common path in order to perform the function of a conveyor system would provide for an efficient and continuous flow of parts through a factory or warehouse.

DISCLOSURE OF INVENTION

In accordance with the invention, an unmanned guided vehicle is propelled along a selected path by a traction means. The vehicle is provided with guide means guiding movement of the vehicle along the path. A first control means controls movement of the vehicle on the path. The vehicle comprises storage means for storing at least one container on the vehicle and transfer means mounted on one end of the vehicle for vertical movement on the vehicle for moving the at least one container from a stationary location through the vehicle one end and to the storage means. Second control means are provided for selectively controlling the transfer of the container between the stationary location and the storage means. In operation, the vehicle is propelled along the path to the stationary location whereupon the container is moved from the storage means to the transfer means and then to the stationary location or is removed from the stationary location by the transfer means and moved to the storage means.

The transfer means includes an arm mounted to the vehicle for gripping the container and means for extending and retracting the arm into gripping engagement with the container. The arm includes a first arm member mounted for sliding movement on the vehicle and a second arm member mounted for pivoting movement on the first arm member. Further, drive means are included for operably engaging the first arm member so as to effect sliding movement of the first arm member. The second arm member is pivoted by means of an actuator with the second arm member mounting a vacuum means which grips the container. A sensor is provided at the vacuum means wherein the sensor includes a regulator for controlling the supply of a vacuum to the vacuum means so as to grip the container.

The transfer means also includes a table which supports the container when loaded on the cart. The transfer means include rollers mounted in the table which facilitate movement of the container between the transfer means and the stationary location and between the storage means and the table. A power means is operatively connected with the roller means for driving the rollers. First and second sets of rollers are driven in mutually perpendicular directions with the first set of rollers facilitating movement of the containers between the table and the stationary location and the second set of rollers facilitating movement of the containers between the storage means and the table.

A powered lift mechanism effects vertical movement of the transfer means on the vehicle. The powered lift mechanism includes a position detector which determines the vertical position of the transfer means on the vehicle relative to the stationary location so as to align the transfer means with the shelf or the like.

The storage means on the vehicle is in the form of at least one horizontal storage surface which may be in the form of a powered conveyor. The powered conveyor facilitates movement of the containers between the storage means and the transfer means. In one embodiment a plurality of vertically spaced horizontal storage surfaces are mounted on the cart.

The control means for the vehicle includes a memory which stores information describing the contents of the containers and the location of the containers on the vehicle. The control means communicates with the vehicle by means of radio transmission circuitry.

The invention also encompasses a materials handling system including a self-propelled, automatically controlled vehicle which follows a path connecting at least three spaced areas in a building. The vehicle transports a plurality of work containers between the three spaced areas and the vehicle comprises means for automatically and selectively unloading one of said plurality of containers from the vehicle at any one of the three spaced areas. The vehicle includes a plurality of horizontal storage support means and means for selectively storing the containers in the storage support means. The materials handling system further comprises a central control means placed at a fixed location relative to the vehicle and in the building and separate from the three spaced areas. The central control means includes means for communicating information between the control means and the vehicle wherein the central control means controls travel of the vehicle between the spaced areas. The central control means also is adapted to control loading and unloading of containers to and from the vehicle. The containers are provided with indicia which are read by a reader mounted on the vehicle to identify the contents of the containers. The reader communicates with the central control means the identity of each container and its location on the vehicle.

BRIEF DESCRIPTION OF DRAWINGS

The invention will be described with reference to the accompanying drawings wherein like members bear like reference numerals and in which.

BEST MODE FOR CARRYING OUT THE INVENTION

Figure 1:
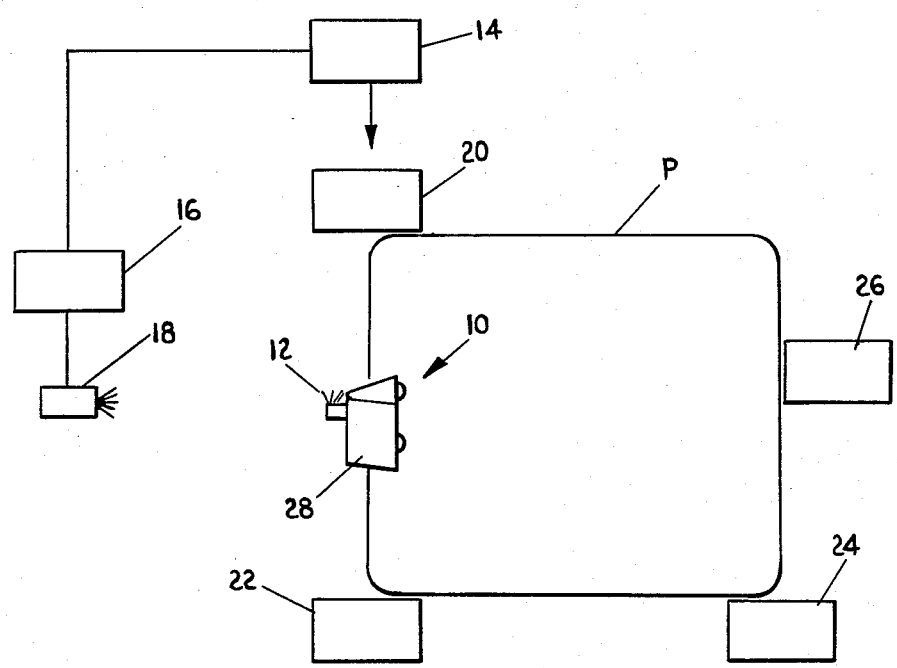
FIG. 1 is a schematic diagram showing an embodiment of the automated materials handling system in accordance with the invention.

Referring now to the drawings, FIG. 1 is a schematic illustration of a materials handling system in accordance with the invention. The materials handling system includes an unmanned, guided vehicle 10 which picks up and delivers parts, raw materials, work in progress and finished goods between storage areas, work stations, test areas and shipping areas. The vehicle travels along a path P laid out in a building, such as a manufacturing plant. The vehicle can be a line follower vehicle which follows a line on the floor such as disclosed in U.S. Pat. No. 3,970,840, commonly assigned with this application. The manner in which the vehicle is guided about the path will not be described herein and reference is made to the above United States patent for a description of the operation of the unmanned vehicle. Alternatively, the vehicle could ride along a fixed rail or be guided by a buried-wire guidance system. Further, the vehicle can be guided by means of a reflected light sensing system wherein a visible line is marked along the surface of a floor.

The vehicle 10 is provided with a radio frequency (RF) antenna 12 which is connected to conventional transmission/reception circuitry described herein. The RF antenna 12 allows for communication with a central computer 16 having a like RF antenna 18 and associated transmission/reception circuitry. A more detailed description of the communication between the vehicle 10 and central computer 16 will be found below. The building includes a receiving area 14 in which raw materials and parts used in constructing a particular device are brought into the manufacturing plant. The raw materials and parts are then transferred to a fixed storage area 20. The fixed storage area 20 typically comprises vertical shelving. A number of such storage areas 20 can be arranged about the manufacturing plant.

The manufacturing plant includes a work area 22 which can comprise a number of individual work stations. A typical manufacturing plant also includes a test area 24 and a shipping area 26. Again, the test area 24 and shipping area 26 each can comprise a number of individual work stations. The fixed storage 20, work area 22, test area 24 and shipping area 26 all lie on the path P about which the vehicle 10 travels. It thus can be seen that raw materials and parts can be delivered from the storage area 20 to the work area 22 for assembly and then delivered to the test area 24 and finally to shipping 26.

When raw materials and parts are brought into the receiving area 14, an inventory of the parts and materials can be compiled in the computer 16. In order to keep track of what materials are in storage area 20, work area 22, testing area 24 and shipping area 26, as well as on the vehicle 10, the vehicle 10 can be provided with an optical reader 28 or a similar device. The reader 28 scans a container 30 which includes an optical code 34 (FIG. 2) in which the raw materials or assembled parts are held and then relays a signal to the computer 16. The signal has information to inform the computer 16 what is in the container 30 so that at all times the system knows what is in receiving 14, storage area 20, work area 22, test area 24 and shipping area 26, as well as what is on the vehicle 10. It is contemplated that a number of such vehicles 10 can be used in the system so that a continual flow of parts from receiving to storage and assembly and the like can be maintained. In this way, the needs for fixed conveyor systems or the like which have been used in the past can be avoided. The use of the computer 16 also obviates the need for a collision avoidance system.

The path P shown in FIG. 1 is merely representative of one path of travel of the vehicle 10. If a number of work stations are set up in the manufacturing plant, branches can extend off the path P to provide for travel of the vehicle 10 to each work station. Further, branches or sidings can be provided so that the vehicle 10 can function as a temporary storage area or, alternatively, allow one vehicle 10 to pass another.

Figure 2:
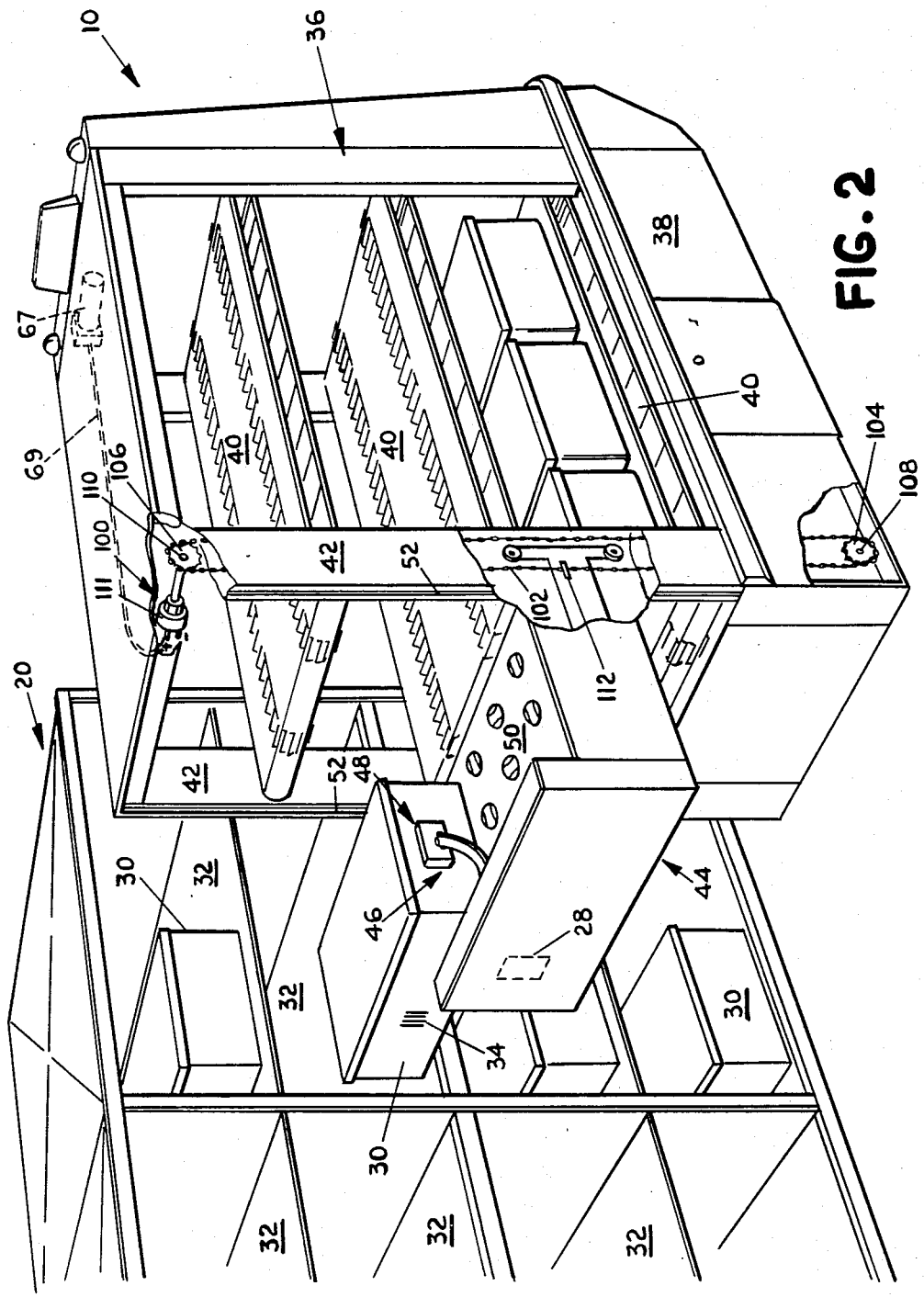
FIG. 2 is a perspective view of an unmanned vehicle, partially broken away, used in the materials handling system of FIG. 1.

FIG. 2 illustrates the vehicle 10 in the process of loading a container 30 from fixed shelving 32 in the storage area 20. The containers 30 store raw materials, parts and partially assembled or fully assembled items. The containers 30 are generally rectangularly shaped. Suitable containers can include a Herman Miller "C" tote or a similar Westinghouse tote. The containers 30 are preferably provided with an optically read bar code 34 which is read by the optical reader 28 on the vehicle 10. The bar code 34 and reader 28 allow the computer 16 to store information regarding the location of each part or assembled item in the system at all times.

The vehicle 10 includes a frame 36 secured to a base portion 38 which contains a drive motor (not shown) for driving wheels (not shown). The wheels are driven by a driven mechanism such as a chain drive. Reference is made to U.S. Pat. No. 3,970,840 a description of an illustrative drive mechanism for an unmanned vehicle. Also contained in the base 38 is a storage battery for providing power to the drive mechanism. The steering and power mechanisms for the vehicle 10 and the manner in which the vehicle 10 follows the path P will not be described herein and reference is made to the above referenced United States patent and for details of how the vehicle 10 travels about the path.

As shown in FIG. 2, the frame 36 supports three storage levels which are preferably in the form of continuous conveyor-type racks 40. Further description of the conveyor storage racks 40 will be made below with reference to FIG. 6. Mounted to frame 36 for vertical movement thereon along frame members 42 is a platform 44. The platform 44 provides a picking mechanism for either removing containers 30 from a stored location or dispensing containers to a stored location or work area. The platform 44 includes a gripping mechanism 46 which alternately grips and releases the containers 30 in order to dispense them to a stored location or work area or remove them from a stored location or work area. Details of the gripping mechanism 46 will be found below. The gripping mechanism 46 includes a vacuum suction device 48 which holds and releases the container 30 for movement onto and off of the platform 44. The platform 44 further includes a drive table 50 which assists in driving the container 30 onto and off of the platform 44. Details of the drive table 50 will be found below with reference to FIG. 13.

The platform 44 is joined to the vehicle frame 36 and to the frame members 42 by a pair of slide mechanisms 52. Each slide mechanism 52 comprises three interfitted rails with ball bearings therebetween such as used in a full extension drawer slide. One rail is secured to the frame members 42, one rail is secured to the platform 44 and an intermediate rail 54 slides between the platform and frame member rails. An example of such a drawer slide can be found in U.S. Pat. No. 4,004,841 issued Jan. 25, 1977. The rails attached to the platform 44 can be telescoping so as to allow for the extension of the platform to heights above the top of the vehicle 10 as illustrated in phantom lines in FIG. 3. In this way, relatively high shelving can be reached by the platform 44.

Figure 3:
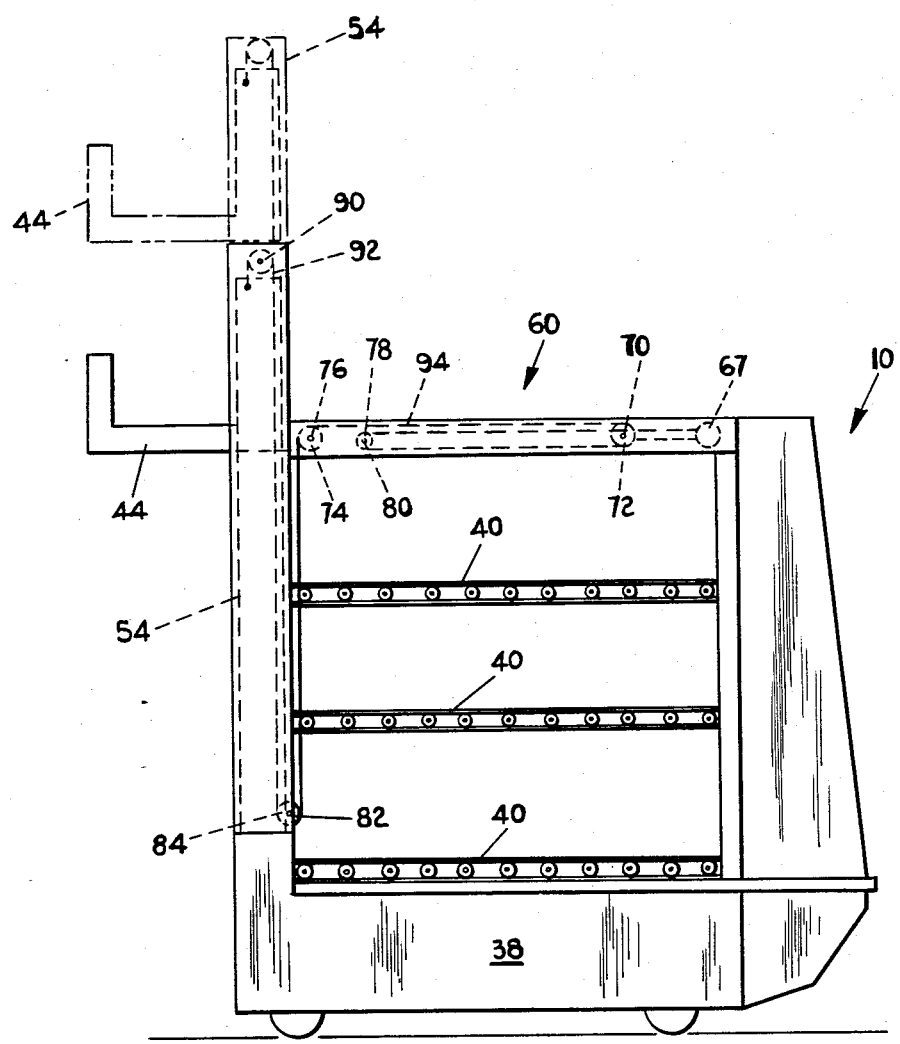
FIG. 3 is a side view of an unmanned vehicle used in the materials handling system of FIG. 1.
Figure 4:
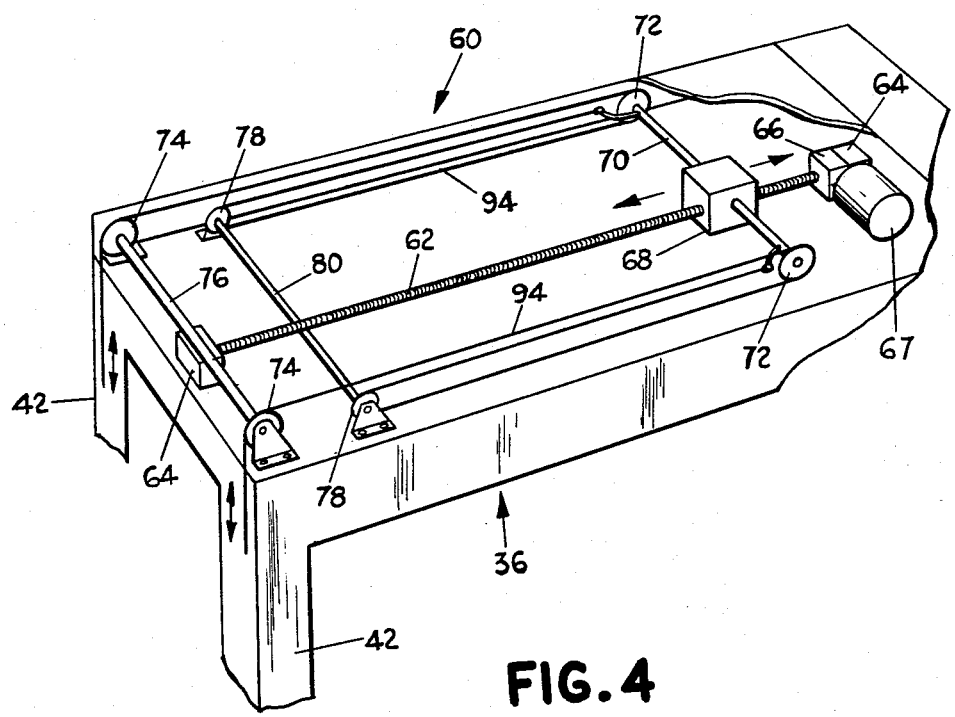
FIG. 4 is a detailed perspective view of the drive mechanism for raising and lowering the platform of the unmanned vehicle.
Figure 8:
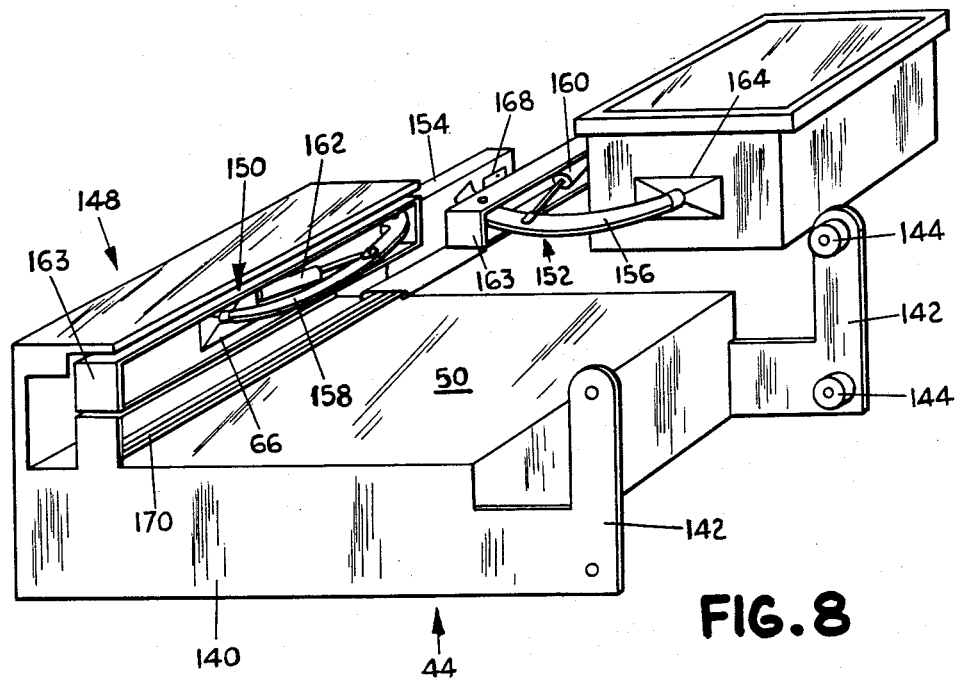
FIG. 8 is a perspective view of the mechanism for extending the gripping arm of the unmanned vehicle.

Turning to FIGS. 3 and 4, the drive mechanism for raising and lowering the platform 44 is shown. The platform 44 is raised and lowered by means of a pulley drive system 60 preferably mounted in the top portion of the vehicle 10. The pulley drive mechanism 60 includes a lead screw 62 journaled at opposing ends in bearings 64 mounted to the vehicle frame 36. The lead screw 62 is operably connected with a gear box 66 which in turn connects with a motor 67. Mounted for travel along the lead screw 62 is a ball nut 68. Rotation of the lead screw 62 causes the ball nut 68 to travel along the length of the screw 62.

The ball nut 68 supports a shaft 70 which mounts pulleys 72 at each end. It thus can be seen that as the ball nut 68 travels along the lead screw 62, the shaft 70 and the attached pulleys 72 travel with the ball nut. Travel of the shaft 70 and pulleys 72 is illustrated in FIG. 3 by the dotted lines.

Mounted to the back of the vehicle 10 is a second set of pulleys 74 journaled on a shaft 76. The shaft 76 is fixed relative to shaft 70. A second shaft 80 which mounts at its outer ends another set of pulleys 78 is also fixed to the rear end of the vehicle 10. The two shafts 76 and 80, along with their respective pulleys 74, 78 provide a means for synchronizing movement of the moveable shaft 70 so as to control raising and lowering of the platform 44 even though the loads in the two cables 74 may not be equal.

Mounted to the intermediate rail 54 of each slide mechanism 52 adjacent the lower portion thereof is another shaft 82 which mounts pulleys 84. At the upper end of the intermediate slide of each slide mechanism 52 is still another shaft 90 which mounts pulleys 92. A cable 94 is reeved over all the pulleys so as to provide a means for raising and lowering the platform 44. One end of the cable is fixed adjacent the front of the vehicle 10, preferably near pulleys 72, while the other end of the cable is fixed to the rail on the platform 44. It can be seen that as shaft 70 travels with the ball nut 68 toward shaft 76 at the rear of the vehicle 10 the platform 44 is lowered. Similarly, as the shaft 70 travels toward the front of the vehicle 10, as is shown in FIG. 3, the platform 44 is raised. This pulley and cable drive mechanism 60 provides a relatively simple means for raising and lowering the platform 44.

Figure 5:
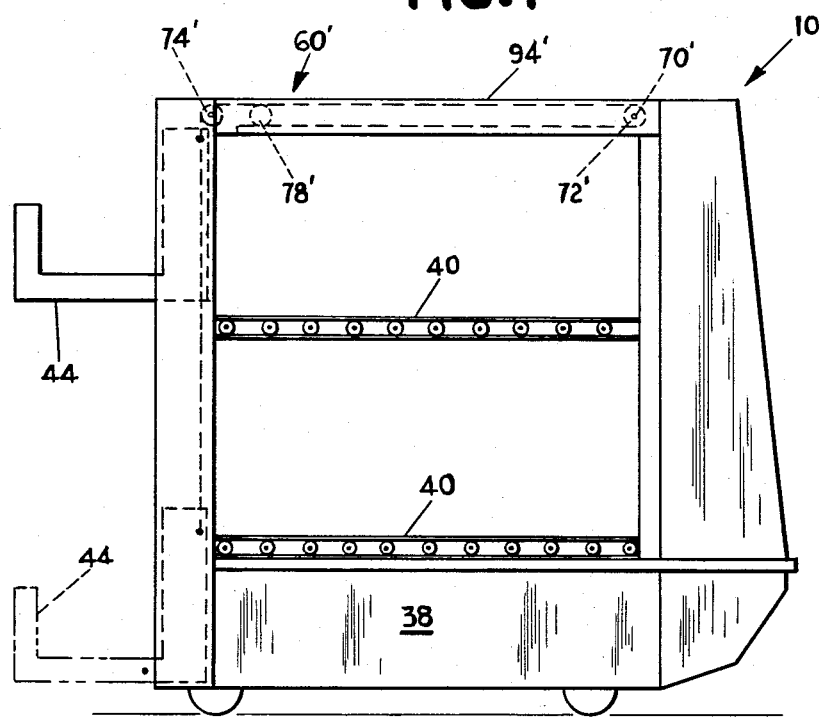
FIG. 5 is a side view of an alternate embodiment of the unmanned vehicle in accordance with the invention.

FIG. 3 shows a high-rise platform which enables the platform to reach relatively high shelving. Alternatively, the travel of the platform can be limited to the height of the vehicle 10. This embodiment is shown in FIG. 5. As can be seen in FIG. 5, the cable and pulley drive 60 includes only three sets of pulleys 72', 74' and 78'. The cable 94' is fixed adjacent the front of the vehicle 10 and is reeved over the three sets of pulleys 72', 74', 78' with one end of the cable 94' being attached to the platform 44 and the other end attached adjacent the end of the vehicle 10. In this embodiment, the intermediate rail 54 of each slide mechanism is eliminated and the remaining two rails interfit with each other in the manner of a two rail drawer glide. Again, it can be seen that as the shaft 70' which mounts pulleys 72' is driven toward the front of the vehicle the platform is raised, while moving the shaft 70' and attached pulleys 72' toward the rear of the vehicle 10 lowers the platform 44.

FIG. 2 also illustrates a position detector for the platform 44. The position detector 100 comprises a continuous bead chain 102 or a similar flexible drive element reeved over sprockets 104, 106 supported on the frame of the vehicle 10 at opposite ends of travel of platform 44. The sprockets 104, 106 are mounted to respective shafts 108, 110 journaled on the frame of the vehicle. The chain 102 or like element is fixed to the platform 44 by means of a tab or flange 112. The shafts 108, 110 which mount the sprockets 104, 106 are not driven. It can be seen that as the platform 44 is raised and lowered, the chain 102 is displaced so as to rotate the sprockets 104, 106 and shafts 108, 110.

In order to provide a position detector for the platform 44, shaft 110 is connected to a multiturn spiral wound potentiometer 111. Rotation of the shaft 110 thus moves the wiper arm over the windings of the potentiometer. The output of the potentiometer is compared to a set voltage which indicates a certain shelf height. The platform 44 is at the selected height when the voltages are equal. One means for accomplishing this alignment is to relay the potentiometer output to a conventional servo-feedback circuit 69 which controls operation of platform motor 67.

Figure 6:
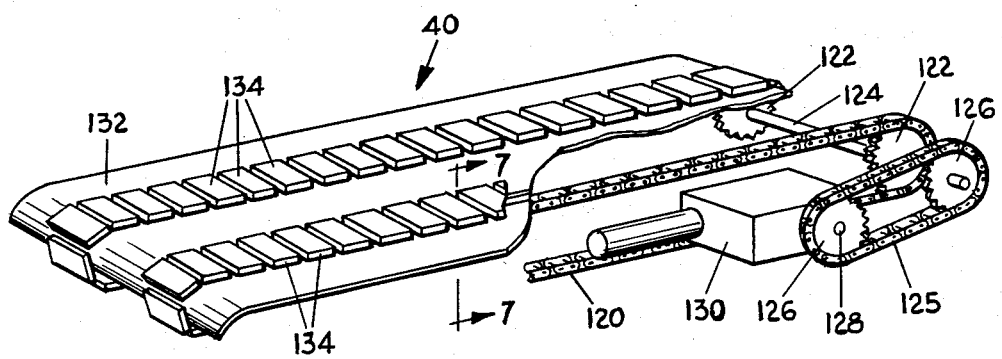
FIG. 6 is a detailed perspective view, partially broken away, of the drive mechanism for the conveyor rack which forms part of the unmanned vehicle.
Figure 7:
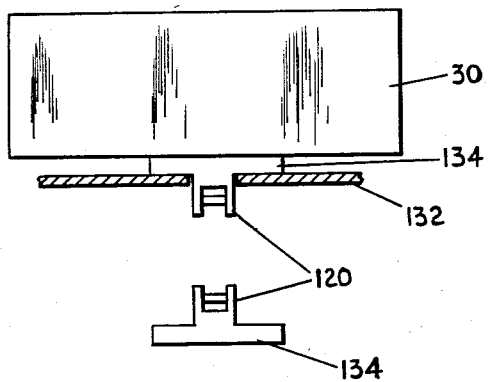
FIG. 7 is a cross-sectional view taken along lines 7—7 of FIG. 6.
Figure 12:
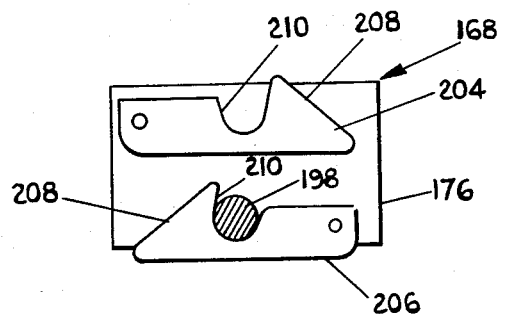
FIG. 12 is a partial sectional view taken along lines 12—12 of FIG. 9.

FIGS. 6 and 7 illustrate the conveyor racks 40 in detail. Conveyor rack 40 comprises a slotted sheet 132 and chains 120 which are reeved about sprockets 122 mounted to shafts 124 which in turn are journaled on the vehicle frame 36. The shaft 124 is driven by means of a chain 125 which is operatively connected to a gear box and motor 130 by means of sprockets 126, one of which is mounted to an output shaft 128 of the motor 130. The motor and gear box 130 have a reversible drive so as to drive the chain 120 in opposite directions. The chain 120 mounts raised, molded-plastic treads 134. The treads 134 provide a means for gripping the container. The chain 120 and treads 134 extend through the slotted sheet 132 which serves as a shelf or support for containers. Alternatively, each conveyor rack 40 can be driven by a common motor which is connected to each rack by a vertical shaft and a clutch mechanism (not shown).

FIGS. 8 through 12 illustrate details of the platform 44, gripping mechanism 46, and vacuum suction device 48 which provide a means for gripping the container 30 for removal or placement on a shelf.

The platform 44 includes a frame 140 having arms 142 on one side thereof. The arms 142 mount rollers 144 which are received in the slide mechanism 52 so as to provide for vertical sliding movement of the platform 44 on the vehicle 10. The frame 140 supports the drive table 50 which will be described below with reference to FIG. 13. The frame 140 also mounts a housing 148 in which is disposed the gripping mechanisms 46.

Figure 9:
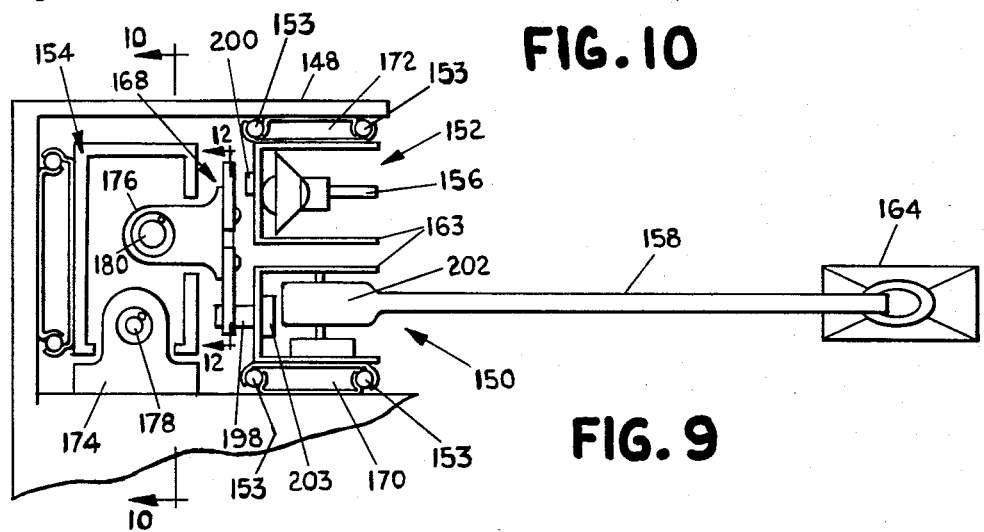
FIG. 9 is an end view of the mechanism for extending and retracting the gripping arm of the unmanned vehicle.
Figure 11:
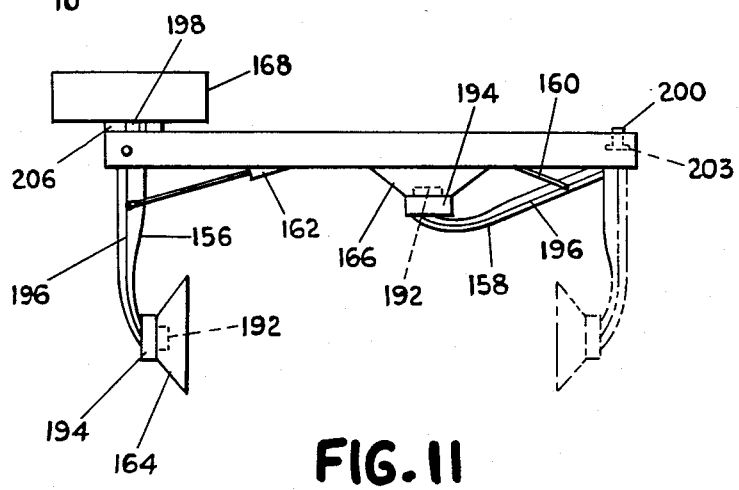
FIG. 11 is a top view of the extension and retraction mechanism of FIG. 9.

The gripping mechanism includes an upper vacuum arm assembly 150 and a lower vacuum arm assembly 152. The vacuum arm assemblies 150, 152 are mounted for sliding movement in the housing 148 as will be described below. Travel of the vacuum arm assemblies 150, 152 is effectuated by means of a ball screw drive mechanism 154. The vacuum arm assemblies 150, 152 each support vacuum cup arms 156, 158 which are pivotally mounted thereto. Each vacuum cup arm 156, 158 is extended and retracted by means of an actuator 160, 162 housed in channel 163. The actuator 160, 162 is preferably in the form of a cylinder which can be hydraulically or pneumatically operated so as to extend and retract the vacuum cup arm 156, 158. At the end of each vacuum cup arm 156, 158 is a vacuum cup 164, 166 which provides a means for gripping the container 30. Also disposed within the housing 148 is a latch mechanism 168 which connects the ball screw drive mechanism 154 with either of the two vacuum arm assemblies 150, 152. Details of the latch mechanism 168 will be found below. The upper and lower vacuum arm assemblies 150, 152 are mounted to the housing 148 through channels 163 by means of slides 170, 172, as can be seen in FIG. 9. The slides 170, 172 can be conventional drawer-type slides having one rail fixed to the housing 148 and a second rail fixed to the channels 163. Sliding movement of the two rails with respect to each other is facilitated by ball bearings 153. Other forms of sliding mounts which allow for sliding movement of the vacuum arm assemblies 150, 152 relative to the housing 148 can be used in place of the slides 170, 172.

Figure 10:
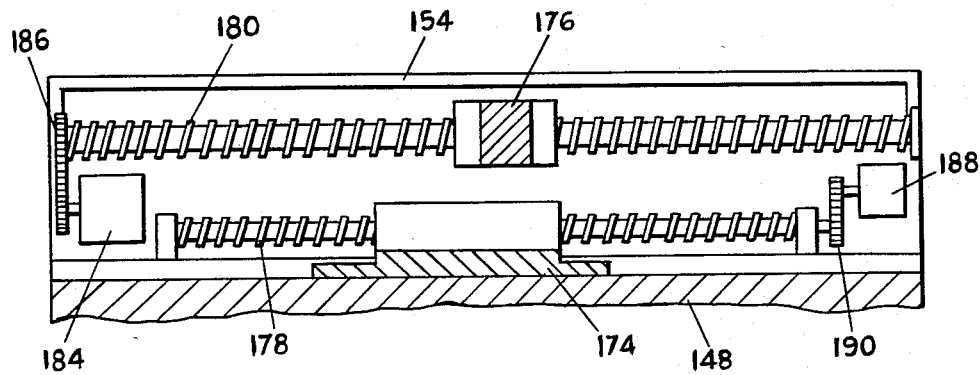
FIG. 10 is a cross-sectional view taken along lines 10—10 of FIG. 9.

The ball screw drive mechanism 154 includes a first ball nut 174 mounted to the housing 148 and a second ball nut 176 mounted to the latch mechanism 168 (See FIGS. 9 and 10). The entire ball screw drive mechanism 154 is moveable relative to the housing 148. Each of the ball nuts 174, 176 is mounted on a threaded ball screw 178, 180. As can be seen in FIG. 10, the ball screws 178, 180 are operatively connected to drive motors 184, 188. Drive motor 184 rotates ball screw 180 and is connected thereto by means of gearing 186. In a similar fashion, ball screw 178 is operatively connected to a motor 188 by means of gearing 190. It can be seen that rotation of ball screw 178 causes the ball screw drive mechanism 154 to be displaced relative to the housing 148 since the ball nut 174 is fixed to the housing 148. Rotation of ball screw 180 causes ball nut 176 to be displaced along the length of the screw 180 so as to further extend or retract the channels 163 which mount the vacuum arm assemblies 150, 152 which are connected to the ball nut 176 by means of the latch mechanism 168. Further details of the operation of the drive mechanism 154 will be found below.

Each vacuum cup 164, 166 includes a pressure responsive sensor 192 therein which detects the presence of a container 30. The sensors 192 serves to provide a vacuum to the suction cups 164, 166 in order to grip the container 30. A solenoid valve 194 is provided on each of the cups 164, 166 to control the creation and release of a vacuum at the cups 164, 166. The solenoid valves 194 are operated by the sensors 192 to control the connection of the cups 164, 166 to a vacuum source (not shown) through a vacuum line 196. The vacuum source would typically include a surge tank in order to provide an instantaneous vacuum at the cups 164, 166 when it contacts a container 30.

Each vacuum arm assembly 150, 152 cooperates with a retractable drive pin 198, 200 (see FIGS. 9, 11 and 12) which engages the latch mechanism 168 in order to provide a connection between the ball screw drive assembly 154 and each arm 150, 152. The drive pins 198, 200 are reciprocally mounted and are in a retracted position when the vacuum arms are retracted. Extension of the vacuum arm 156, 158, which occurs when the vacuum arm actuator 160, 162 is actuated, causes the drive pin 198, 200 to be extended. In this regard, the hub 202 of the vacuum arm 156, 158 functions as a camming surface which engages a head 203 of the pin 198, 200 as the arm 156, 158 rotates to the extended position. The pin 198, 200, in the extended position, engages a latch 204, 206 mounted on the latch mechanism 168. Latch 204, 206 includes a ramp 208 over which the pin 198, 200 rides into engagement with a notch 210 in the latch to connect the vacuum arm assembly 150, 152 with the drive mechanism 154.

Figure 13:
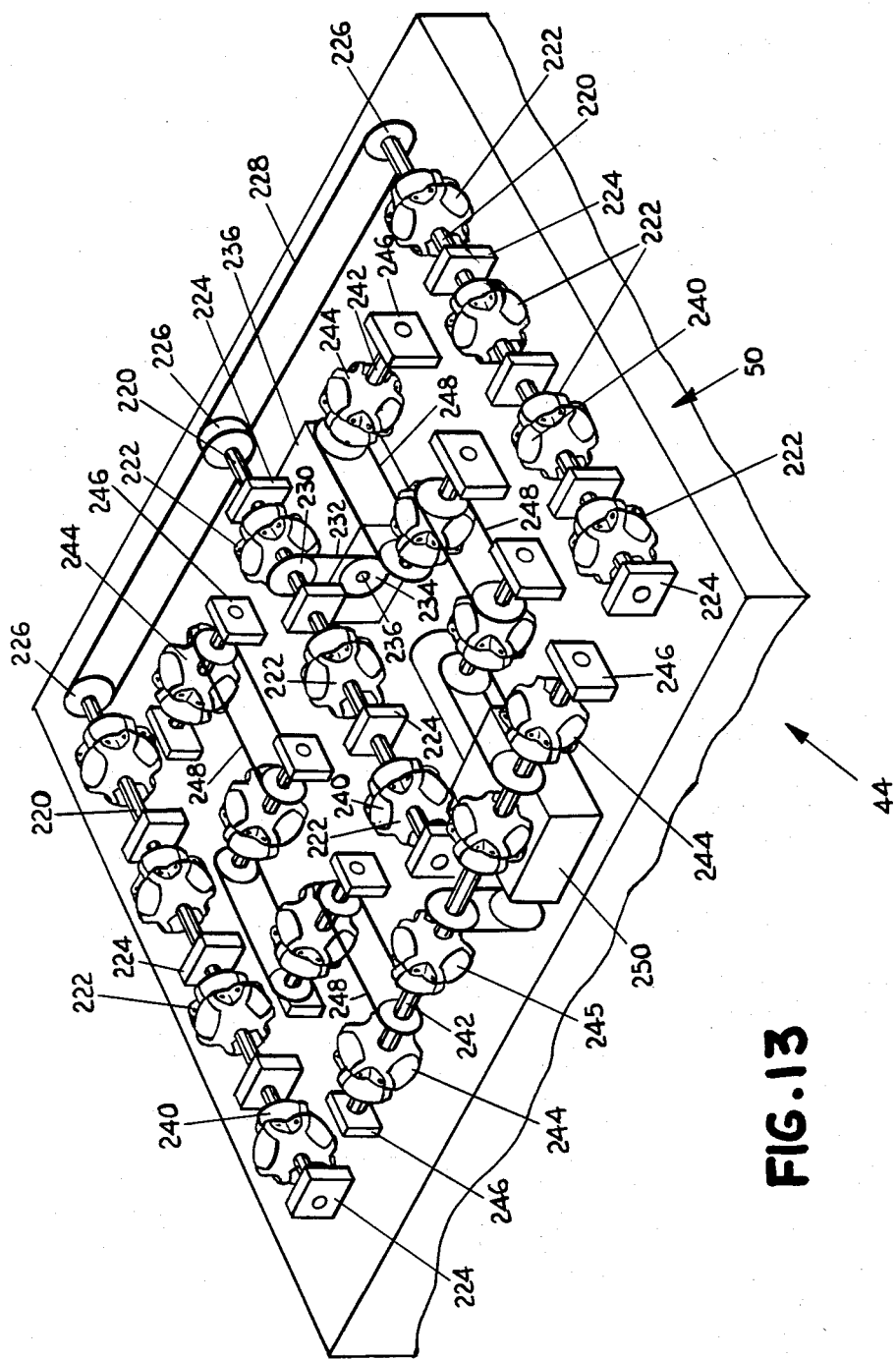
FIG. 13 is a perspective view of the drive table which forms part of the platform of the unmanned vehicle.

Referring now to FIG. 13, the platform 44 supports a drive table 50 which includes a plurality of rollers 222, 244 which are rotatable both in the direction of travel of the container 30 onto the platform 44 as well as perpendicular thereto so as to transfer the container 30 onto the conveyors 40. The drive table 50 includes a plurality of shafts 220 which support rollers 222 which are rotatable in the direction of travel of the container onto and off of the platform 44. The shafts 220 are supported by bearing blocks 224 mounted to the frame of the platform 44. The shafts 220 mount sprockets or pulleys 226 which are all commonly driven by a chain drive 228 or a similar flexible drive element. One of the shafts 220 mounts a sprocket or pulley 230 which is connected by means of a flexible chain or belt drive 232 to a corresponding pulley or sprocket 234 which is connected to the output shaft of a motor and gear box 236. Thus, all of the shafts 220 are driven synchronously to drive a container onto and off of the drive table. Although the rollers 222, are driven in the direction of travel of the container onto and off the platform, they include secondary rollers 240 which allow the container to roll in a direction perpendicular to its direction of travel onto and off of the platform. The secondary rollers 240 are not powered. One typical form of roller 220 which may be employed is the Inter-Roll Omniwheel.

The drive table 50 includes a second set of rollers 244 which are driven in a direction to and from the conveyors 40. In this regard, a plurality of shafts 242 support rollers 244 which are journaled in bearing blocks 246. The rollers 244 are identical to rollers 222 except that the axes thereof are disposed perpendicular to the axes of rollers 222. The secondary rollers 245 on rollers 244 allow for movement of the container to and from a storage surface and onto the platform 44. The shafts 242 are connected to a common drive by a flexible drive elements such as chains 248. The chains 248 connect all of the shafts 242 to a common motor 250 which includes a gear box in a fashion similar to that described above with reference to the rollers 222. It thus can be seen that the drive table 50 includes a power drive for pushing or pulling containers onto the platform 44 from a storage surface or from the platform 44 onto the conveyors 40.

Figure 14:
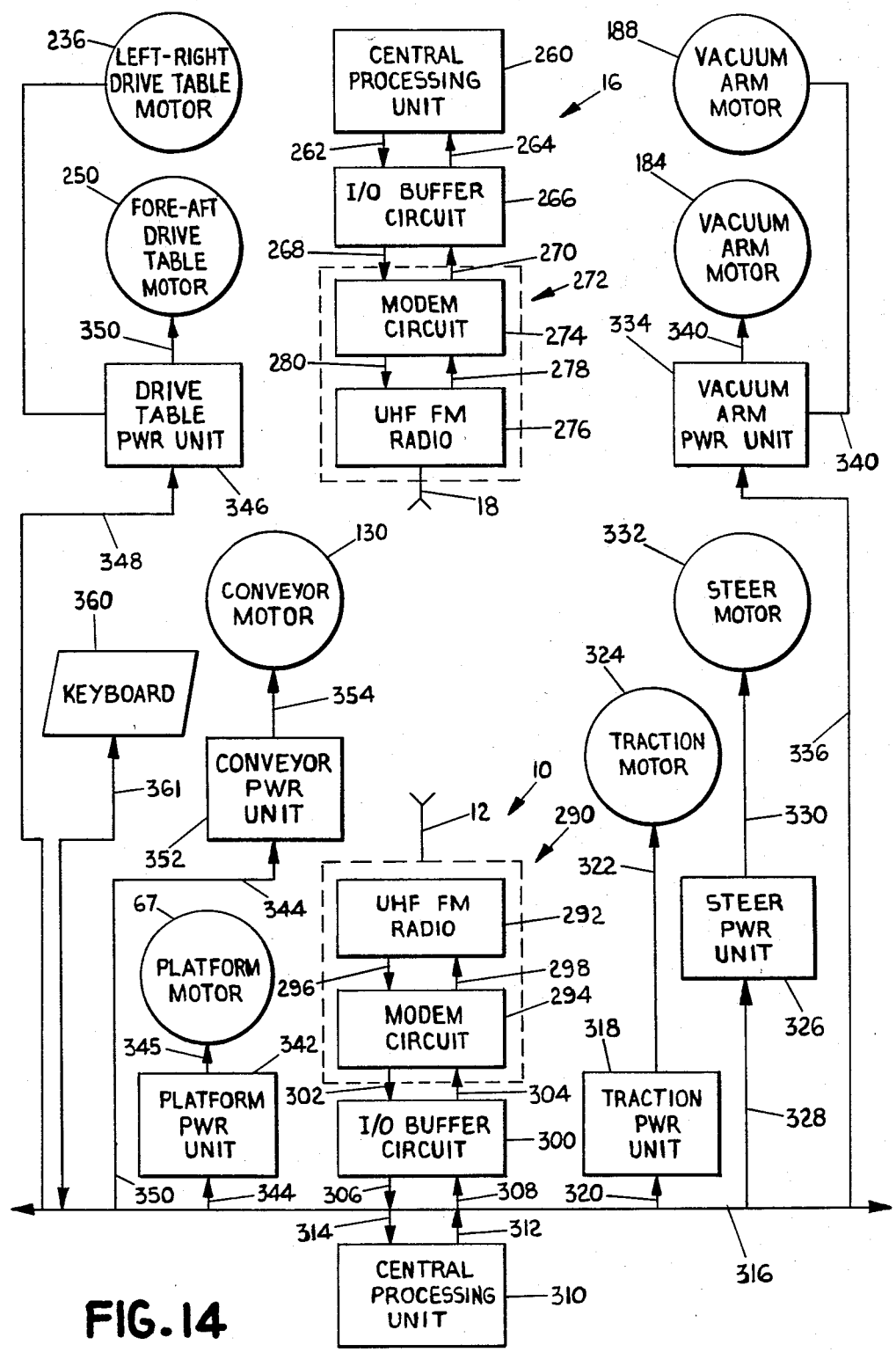
FIG. 14 is a block diagram of the control circuit including the central computer and the unmanned vehicle in accordance with the invention.

FIG. 14 is illustrative of a block diagram of a control circuit for controlling the vehicle and its interaction with the central computer 16. The circuit allows for communication between the central computer 16 and the vehicles 10 to provide a means for giving commands to the vehicle in order to carry out its materials handling functions.

As shown in FIG. 14, the central computer 16 includes a central processing unit (CPU) 260. Unit 260 provides a means for storing information signals and generating signals in order to control movement of the vehicle 10 as well as store information regarding the location and quantity of parts in the system at all times. Unit 260 can comprise any one of numerous commercially available processors and memory configurations. The signals of CPU 260 are applied as input signals to an input/output buffer circuit 266 through line 262. Further, the CPU 260 receives signals from the input/output buffer circuit along line 264 which signals are generated by the vehicle 10 as will be described below. The input/output buffer circuit 266 is interconnected with an RF transmission/reception circuit 272 by means of lines 268 and 270. RF transmission/reception circuit 272 provides a means for communication between the vehicle 10 and the central computer 16. As shown in FIG. 14, circuit 272 comprises a UHF FM radio 276 having an antenna 18 connected thereto. Radio 276 provides a means for transmitting and receiving information signals between the computer 16 and the vehicle 10.

Signals received at the radio circuit 272 by means of the antenna 18 are applied as input signals to modem circuit 274 through line 278. Alternatively, the output of the buffer circuit 266 which translates an instruction from the computer 16 can be applied to the modem circuit through line 268 which in turn interfaces with radio 276 through line 280 so as to communicate with the vehicle 10. Modem circuit 274 is a conventional interface circuit which is responsive to signals on lines 268 and 270 to apply corresponding input and output signals to the radio 276. It can be seen that the radio circuit 272 provides a means for transmitting and receiving signals between the computer 16 and the vehicle 10.

FIG. 14 also illustrates the control circuit carried on the vehicle 10. Vehicle 10 carries a radio circuit 290 which receives signals from the corresponding radio circuit 272. The radio circuit 290 includes a UHF FM radio 292 which applies input signals to modem circuit 294 through line 296. The modem circuit 294 also applies input signals to the radio through line 298 for transmission to the computer 16. The modem circuit 294 is a conventional interface circuit which is responsive to signals on lines 296 and 298. The input and output signals of the modem circuit 294 are transmitted by way of lines 302 and 304 to an input/output buffer circuit 300. The buffer circuit 300 in turn applies the signal to a bus 316 by way of line 306. Further, the buffer circuit 300 can receive signals from the bus 316 by way of line 308 for relay to the radio 292.

Signals on the bus 316 can be applied to a central processing unit (CPU) 310 which provides a means for storing information on the vehicle. CPU 310 can comprise any one of numerous commercially available processors and memory configurations. The CPU 310 can be provided with a stored program, stored data concerning guidepath routing, storage rack heights, and storage rack locations so that it can be responsive to delivery and pickup commands inserted by the keyboard 360 on the vehicle or by central processing unit 260.

Signals on bus 316 can be applied to other circuitry in the vehicle 10. For example, output signals from the CPU 310 can be applied by way of the bus 316 to a traction power unit 318 of the vehicle by way of a line 320. Signals on line 320 are applied as input signals to the traction power unit 318 which in turn generates operational signals on lines 322 to a traction motor 324 so as to move the vehicle. A power unit and traction motor which can be utilized in the vehicle 10 is disclosed in U.S. Pat. No. 3,970,840, commonly assigned herewith.

In a similar fashion, signals can be applied from the bus line 316 to a steering power unit 326 by way of line 328. The steering power unit 326 responds to signals on the line 328 and applies an operational signal on transmission line 330 to a steering motor 332. A steering power unit and motor corresponding to that shown in FIG. 4 is generally described in the aforementioned United States patent.

The signal on bus 316 can be applied to a vacuum arm power unit 334 by way of transmission line 336. The vacuum arm power unit 334 applies an operational signal to a vacuum arm motors 184, 188 by way of lines 340. The vacuum arm motors 184, 188 extend and retracts vacuum arm assemblies 150, 152.

Other signals on bus 316 can be applied to a platform power unit 342 by way of transmission line 344. The platform power unit 342 applies an operational signal on line 345 to the platform motor 67 shown in FIGS. 3 and 4 so as to raise and lower the platform 44. Likewise, the signal on bus 316 can be applied to a drive table power unit 346 by way of line 348. The drive table power unit 346 applies an operational signal along lines 350 to drive table motors 236, 250 which are shown in FIG. 13. Finally, the signal on bus 316 can be applied to a conveyor power unit 352 which applies an operational signal on line 354 to conveyor motor 130.

The above-described circuitry is illustrative of an embodiment for controlling operation of a vehicle platform and the like. While the vehicle has been described with reference to a central computer 16 which controls operation of the vehicle, a keyboard 360 mounted on the vehicle can be used to input and receive signals on the bus 316 along the line 361 to control the various vehicle functions. Further, CPU 260 of the central computer 16 can be preprogramed to dispatch command signals to the vehicle 10 in order to carry out its various functions. Alternatively, the vehicle can be manually controlled by way of a keyboard input to the central computer 16, with communication between the computer 16 and vehicle 10 maintained by spatially transmitted signals received and transmitted by way of antennas 12 and 18.

Figure 15:
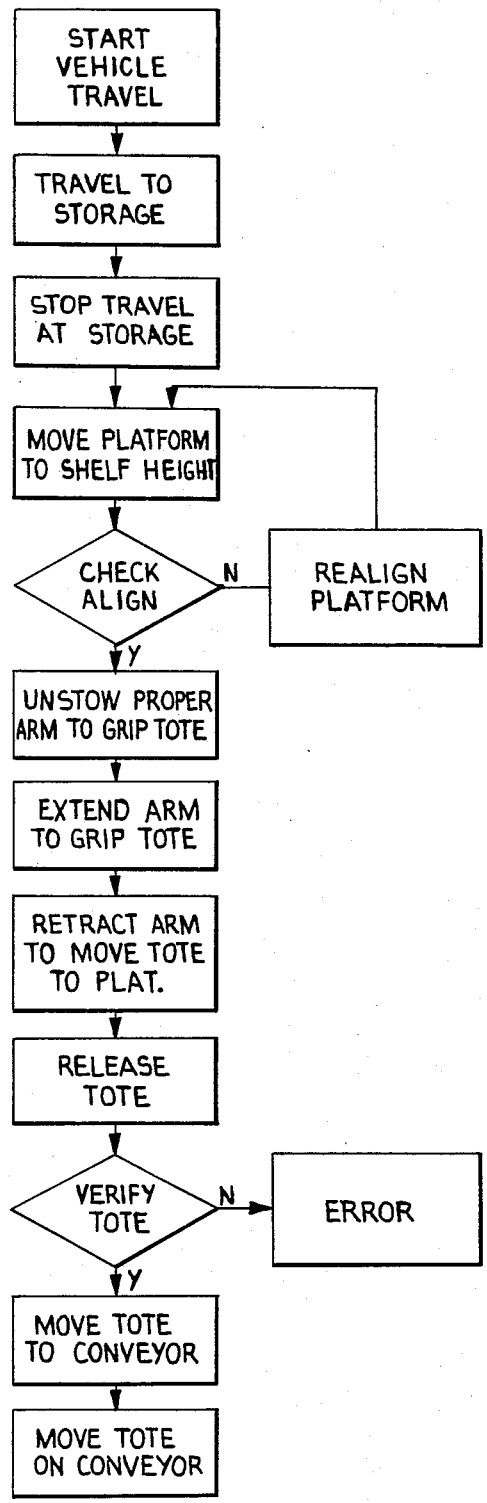
FIG. 15 is a flow diagram showing the steps of loading a container onto the unmanned vehicle.
Figure 16:
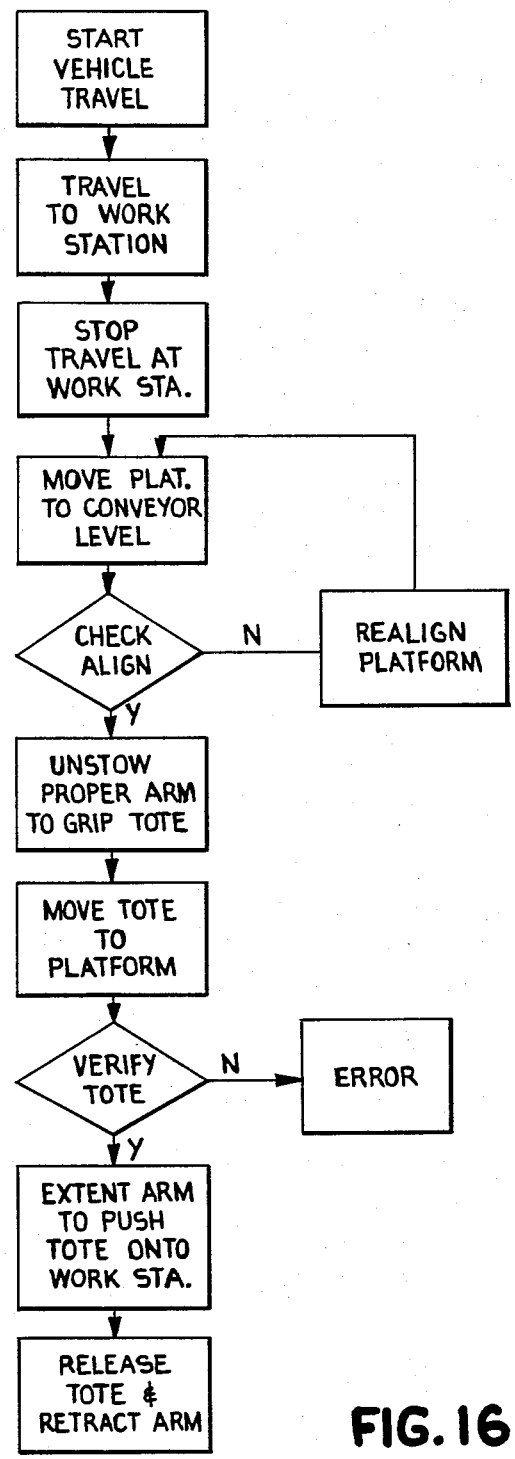
FIG. 16 is a flow diagram showing the steps of unloading a container from the unmanned vehicle.

Operation of the material handling system and the vehicle 10 will be described with reference to flow charts (FIGS. 15 and 16) which are illustrative of the steps which occur in the loading and unloading of a container. Travel of the vehicle is initiated by the transmission of a command signal from the central computer 16 to the vehicle 10. The command signal can be initiated by operation of a manual keyboard communicating with the central processing unit 260 or by a preprogrammed central processing unit 260. The signal instructs the vehicle to start and follow the path P for a selected distance. A signal also instructs the vehicle to follow either the right or left side of the path P so as to turn in the desired direction as the vehicle encounters branches in the path. Finally, a signal will instruct the vehicle to stop at a particular location. It is contemplated that frequent communication between the vehicle and central computer will occur so as to generate the necessary command signals. Once at the selected location a signal is generated which instructs the platform 44 to travel to a certain height in order to pick up or deliver a container. Verification of the contents of the container 30 can be accomplished by way of the optical scanner 28 which reads the bar code 34 on the container, with the scanner 28 communicating with the central computer 16.

The signal transmitted by way of radio circuit 272 and received by the vehicle 10 by means of its antenna 12 is "translated" by means of the radio circuit 290 and buffer circuit 300. The signal is then applied by means of transmission line 306 to bus 316 so as to control various circuitry in order to drive the vehicle, raise the platform and extend the arm and other vehicle functions which are described herein.

By way of example, the steps which the vehicle goes through in picking up a container from a fixed storage area will be described. The signal transmitted by the central computer 16 commands the vehicle to start traveling along the path P. Further signals instruct the vehicle to turn and stop so that the vehicle is aligned with the storage shelving or a work station. A code can be placed on the path to provide a means for intermittently checking the vehicle location. With the vehicle aligned at the shelving, a signal is applied to the vehicle to instruct the platform to move to certain height. In this regard, the signal on the bus 316 actuates the platform power unit 342 which in turn operates platform motor 67 to raise or lower platform 44 in order to align it with the shelf on which a container is located. Alignment of the platform 44 with the shelf can be accomplished through the feedback circuit shown in FIG. 2. With the shelf and platform 44 aligned, a signal is then applied to the vacuum arm power unit 344 which causes vacuum arm motor 338 to extend the proper arm assembly 150 or 152. Once adjacent the container, the arm detects the presence of the container by means of the position sensor 192. The sensor 192 provides a signal to the solenoid valve 194 which regulates operation of the vacuum source to provide a vacuum at the cup 164. With the cup 164 in contact with the container and the vacuum supplied to the cup, the container is gripped. The extended arm assembly 150 or 152 is then retracted so as to pull the container onto the drive table. The rollers on the drive table can be actuated so as to assist in pulling the container onto the platform. Actuation of the drive table motor 236 is provided by means of the signal on the bus 316 which is transmitted to the drive table power unit 346. Verification of the container contents can be accomplished through the optical scanner 28 and bar code 74.

Once on the platform 44, the container is transferred to one of the three conveyor storage racks 40 by means of the drive table rollers. A signal transmitted by the central computer can instruct the vehicle to store the container at a particular level so that further vertical movement of the platform may occur after the container is loaded on the platform. Once the container is transferred to one of the conveyors 40, a signal on bus 316 is applied to the conveyor power unit 352 so as to drive conveyor motor 130 to move the container and allow room for the next container to be loaded on the conveyor rack 40. The vehicle is then instructed to move to another location either to unload the container or pick up further containers. Since the instructions as to pick up and storage of the containers on the vehicle have been sent by the central computer 16, it has stored information as to the identity and location of each container on the vehicle.

The operation of the vehicle in the unload mode is shown by the flow chart (FIG. 16) and essentially comprises the opposite steps of the load mode. A signal is applied to the circuitry in the vehicle in order to command it to perform the steps which are outlined in FIG. 16. In brief, the vehicle is first instructed to travel along the path to a particular location at which the container will be unloaded. A signal received by the vehicle identifies the location of the container on the vehicle and selects to which side the container is to be unloaded. In order to unload the container, the proper vacuum cup arm is pivoted to the extended position. The processor on the vehicle then actuates the conveyor motor in response to a command to drive the container from the conveyor and onto the platform which is aligned with the conveyor. The contents of the container can be verified by the optical scanner as described above before unloading the container from the platform. The vacuum source is then actuated by means of the position sensor and solenoid valve so as to provide a gripping force which enables the arm to grip the container. Drive mechanism 154 is then actuated to extend the arm and push the tote from the drive table onto a work surface. The rollers on the drive table also can be activated to assist in moving the container from the platform to the work surface. When the container has been moved off the platform, the vacuum is deactuated and the arm retracted, thus completing the unloading mode.

As can be seen from the foregoing description, the unmanned vehicle provides a simple mechanism for transporting containers throughout a work area. A number of such vehicles can be positioned on the path so as to provide a continuous flow of materials from the storage area to the work areas. The vehicles are capable of loading and unloading containers holding raw materials, finished parts and the like at any of the work areas, storage areas and test areas. The plurality of vehicles provide for a constant flow of parts through the system and provide a mechanism by which fixed conveyors and the like can be replaced. Changes in the layout of the work areas in the buildings are readily accomplished since there are no permanent structures attached to the building floors or walls so that it is only necessary to change the path in the building so as to correspond to new locations of work areas or storage areas, for example. The vehicles are capable of being controlled from a central location which dispatches the vehicles as needed to a storage area or work area to carry parts to the work area. The central computer stores information relating to the parts in the system at any one time as well as the location of the vehicles. It is contemplated that the vehicles can be dispatched in the system in a random fashion and it is not necessary that the vehicle follow any predetermined sequence of stops although this is possible. The system can be modified to include branches off of the main path so as to allow for a number of work stations or test areas to be serviced by the vehicles.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. An unmanned guided vehicle system comprising:
 a frame including a pair of upstanding frame members at one end of said vehicle;
 traction means for propelling said vehicle along a selected path which includes at least one stationary location;
 guide means for guiding movement of said vehicle along said selected path;
 first control means for controlling the movement of said vehicle along said selected path;
 storage means on said vehicle and extending to said upright frame members for storing at least one container on said vehicle;
 transfer means mounted to said frame members for vertical movement along the outward side of said frame members for moving said at least one container from said at least one stationary location vertically along said outward side of and between said frame members to said storage means on said vehicle; and
 second control means coupled to said transfer means for selectively controlling the transfer of said at least one container between said at least one stationary location and said storage means;
 wherein said vehicle is propelled along said path to said at least one stationary location whereupon said at least one container is moved from said storage means to said transfer means and then along the outward side of said frame members to said at least one stationary location or said container is moved from said stationary location by said transfer means and is then moved through said frame members to said storage means.

2. The vehicle system of claim 1 wherein said transfer means includes arm means mounted to said vehicle for gripping said container and means for extending and retracting said arm means into gripping engagement with said container.

3. The vehicle system of claim 2 wherein said arm means includes a first arm member mounted for sliding movement on said vehicle and a second arm member mounted for pivoting movement on said first arm member.

4. The vehicle system of claim 3 further including drive means operatively engaging said first arm member for effecting sliding movement of said first arm member.

5. The vehicle system of claims 3 or 4 further including actuator means operatively engaging said second arm member for effecting pivoting movement of said second arm means.

6. The vehicle system of claim 3 wherein said second arm member mounts a vacuum means for gripping said container.

7. The vehicle system of claim 6 further including sensor means for detecting the presence of a container at the vacuum means, said sensor means having means for regulating the supply of a vacuum to said vacuum means so as to grip said container.

8. The vehicle system of claims 1 or 2 wherein said transfer means includes a table for supporting said container.

9. The vehicle system of claim 8 wherein said transfer means further includes roller means mounted in said table for facilitating movement of said container between said transfer means and said stationary location and between said storage means and said table.

10. The vehicle system of claim 9 wherein said roller means includes power means operatively connected with said roller means for driving said roller means.

11. The vehicle system of claim 10 wherein said roller means includes first and second sets of rollers driven in mutually perpendicular directions, said first set of rollers facilitating movement of said containers between said table and said stationary location and said second set of rollers facilitating movement of said containers between said storage means and said table.

12. The vehicle system of claim 1 further including powered lift means for effecting vertical movement of said transfer means on said vehicle.

13. The vehicle system of claim 12 wherein said powered lift means includes position detector means for determining the vertical position of the transfer means on said vehicle and relative to said stationary location.

14. The vehicle system of claim 1 wherein said storage means includes at least one horizontal storage surface extending to said frame members.

15. The vehicle system of claim 14 wherein said at least one horizontal storage surface is a powered conveyor, said conveyor facilitating movement of said containers between said storage means and said transfer means.

16. The vehicle system of claims 14 or 15 including a plurality of vertically-spaced horizontal storage surfaces extending to said frame members.

17. The vehicle system of claim 1 wherein said second control means includes memory means for storing information describing the contents of said containers and the location of said vehicle.

18. The vehicle system of claim 17 wherein said second control means further includes radio transmission means communicating said vehicle with said memory means.

19. The system of claim 1 further including indicia on said containers and a reader on said vehicle for reading said indicia on said containers, said reader communicating with said second control means.

* * * * *